Nov. 8, 1966     K. SILVON     3,283,789

SAW CHAIN

Filed Sept. 23, 1963

KAY SILVON
INVENTOR

BY
BUCKHORN, BLORE, KLARQUIST & SPARKMAN
ATTORNEYS

United States Patent Office 3,283,789
Patented Nov. 8, 1966

3,283,789
SAW CHAIN
Kay Silvon, Portland, Oreg., assignor to Omark Industries, Inc., Portland, Oreg., a corporation of Oregon
Filed Sept. 23, 1963, Ser. No. 310,773
9 Claims. (Cl. 143—32)

The present invention relates to an improved saw chain and more particularly to a saw chain having interengaged gear teeth on the ends of side links to provide operating smoothness and stability of the saw chain especially when employed in combination with structure providing for engagement of the drive sprocket teeth with portions of the center drive links of the chain which are in substantial alignment along the path of the chain with the axes of the pivots for the various links of the chain.

The individual links of the most common types of saw chains include a series of closely longitudinally spaced center links pivotally connected to the ends of about equally longitudinally spaced side links. Such chains are driven about the peripheral edge of a chain saw bar by means of a drive sprocket adjacent the rear end of the saw bar. The drive links are provided with lugs or roots which are received in a groove in the periphery of the saw bar to guide the saw chain and retain it on the bar. The sprocket teeth engage these lugs to drive the chain. This engagement is offset a considerable distance from the pivotal axes of the links and the driving force exerted by the sprocket teeth against the lugs tends to rotate the center links to move the lugs outwardly of the normal path of travel of the saw chain. Any slack present in the chain tends to cause the chain to become unstable and to oscillate and cause undue vibration of the saw resulting in rapid wear of the bar and chain, and fatigue to the operator.

Moreover, the foregoing condition may have a detrimental effect on so-called self sharpening saw chains. Sharpening of the cutting edges of such chains depends upon the accurate positioning of the outer surfaces of the cutter links with respect to a sharpening element attached to the saw in position to engage such surfaces. If the positioning of the various cutter links with respect to the sharpening is erratic, such links will be nonuniformly and inaccurately sharpened, resulting in an inefficient and unstable chain.

In accordance with the present invention, the ends of each side link are formed with integral gear teeth which interengage or mesh with gear teeth on forwardly and rearwardly adjacent side links. The gear teeth at each end of each side link form gear segments, i.e. are arranged along an arc, which is concentric with the adjacent pivotal axes of the link. This structure prevents pivotal movement of the side link with respect to an adjacent center link without equivalent opposite pivotal movement of the longitudinally adjacent side link pivotally connected to the same center link. This enables the side links including cutter links which are adjacent each other longitudinally of the chain to rotate relative to each other to enable the chains to go around a sprocket or the nose end of the bar but constrains the independent rotation of a drive link relative to an adjacent side link.

The provision of meshing gear teeth on the ends of the side links is particularly effective when combined with chain structure which provides for driving engagement between the sprocket teeth and the drive links substantially in alignment along the path of the chain with the axes of the pivotal connections between the drive links and the side links. The driving forces between the sprocket teeth and the drive link then has very little tendency to rotate the drive link. A smooth acting and stable chain results.

It is, therefore, an object of the present invention to provide a new and improved saw chain having increased stability and smoothness of operation.

Another object of the invention is the provision of new and improved saw chain in which meshing gear teeth on the ends of the side links restrict the independent pivotal movement of center drive links relative to side links so as to stabilize the operation of the chain.

A further object of the invention is to provide a new and improved saw chain constructed so that it can be driven through engagement of the teeth of the chain saw drive sprocket with the center links substantially in alignment longitudinally of the chain with the axes of the pivotal connections between the various links to thereby increase the stability of operation of the chain.

Other objects and advantages of the present invention will be apparent from the following description thereof made in connection with the accompanying drawings, of which:

Figure 1:
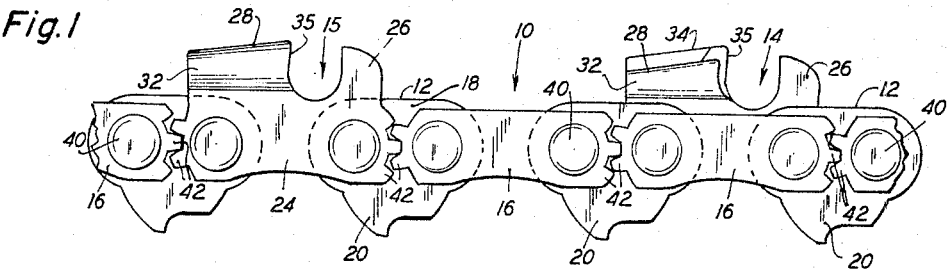
FIG. 1 is a side elevational view of a saw chain in accordance with the present invention.
Figure 2:
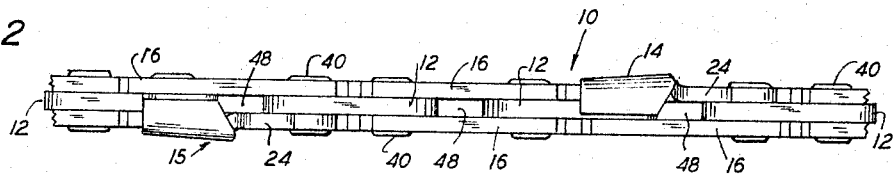
FIG. 2 is a top plan view of the saw chain of FIG. 1.
Figure 3:
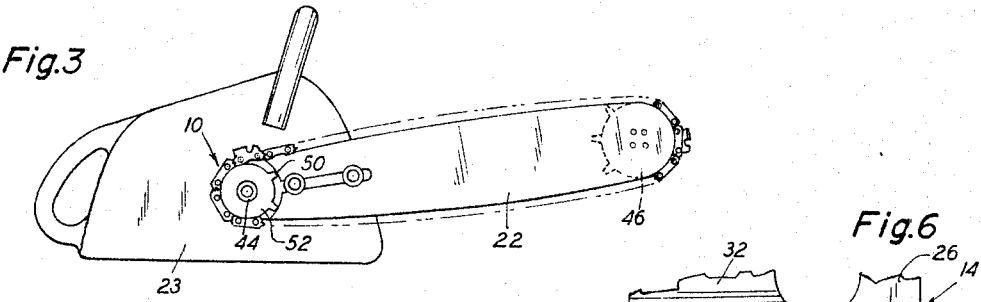
FIG. 3 is a side elevational view on a reduced scale of a chain saw with the saw chain of the present invention mounted thereon.
Figure 5:
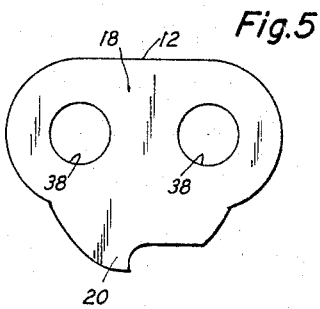
FIG. 5 is an enlarged side elevaional view of a center link in accordance with the present invention.

With reference to the drawings, FIG. 1 illustrates a saw chain 10 including spaced apart center links 12 and side links, including left and right side cutter links 14 and 15, respectively, and side connector links 16 pivotally connecting adjacent center links. As shown most clearly in FIG. 5, each center link 12 includes a center link body 18 and a downwardly extending lug or root 20 which is received in a continuous slot provided in the peripheral edge surface of a saw bar such as the saw bar 22 attached to a chain saw motor unit 23, as shown in FIG. 3.

The side cutter links 14 and 15 include a cutter link body 24, the inner edge of which slides along the peripheral edge surface of the rails of the saw bar, an integral depth gauge 26 extending outwardly from the forward portion of the cutter link body and an integral cutter element 28 extending outwardly from the link body 24 and spaced rearwardly of the depth gauge. Although the cutter elements may be of any of the several known types, the cutter teeth shown are of the popular "chipper" type, which includes a curved shank portion or side plate 32 extending outwardly from the link body 24, as viewed in FIG. 1, and a laterally extending, relatively flat toe or top plate 34 extending from the outer end of the shank 32 inwardly of the saw chain and over the cutter link body. The forward edges of the shank and top plate portions are sharpened to provide a continuous cutting edge 35, the shank portion of which cuts the side of a kerf and the top plate portion of which cuts the bottom of the kerf. The cutter links are identical except for being of alternately left and right configuration.

Each of the bodies 24 of the side links are provided with a pair of rivet holes 36 and the bodies 18 of the center links are provided with a pair of rivet holes 38. The rivet holes are adjacent each end of the various links and receive a rivet or pivot pin 40 for pivotally connecting each center link between a pair of laterally oppositely disposed side links. Thus each link has a longitudinally spaced apart pair of pivotal axes which pass through the link body adjacent each end thereof.

The forward and rearward ends of each side link body are notched so as to form integral gear teeth 42 which extend outwardly from each end in a direction radially of the center of the rivet hole or pivot axis adjacent such end. The gear teeth 42 at each end of each side link body 24 are complementary to the gear teeth on the abutting end of the longitudinally adjacent side link so that the gear teeth on the leading end of one side link interengage with the gear teeth on the rearward end of the forwardly adjacent side link. The gear teeth are arranged in arcs concentric with the pivot axes referred to above so as to form segments of circular gears. Thus when the chain is positioned on the saw bar 22, relative pivotal movement of the side links can occur to an extent sufficient to permit the chain to travel in a sharply curved path around a drive sprocket 44 as well as the nose end of the saw bar 22 and the lesser curved peripheral side edges of such bar.

Such interengagement effectively prevents independent pivoting of the links of a pair of laterally adjacent side links about their axes of pivotal connection to a center link during their travel about the saw bar, even in an excessively slack chain. Each tendency of a side link to rotate about one of its pivotal axes is resisted by the gear teeth of the adjacent side link and, accordingly, one side link, such as one having a cutter element thereon, cannot rotate without its rotation affecting, or being affected by, several of the other side links. The increased interdependence of the side links has a stabilizing effect of the chain in that it tends to dampen oscillations from the normal path of the chain which would otherwise occur as a result of the high speed travel of the chain in a curved path around the saw bar and drive sprocket.

Figure 4:
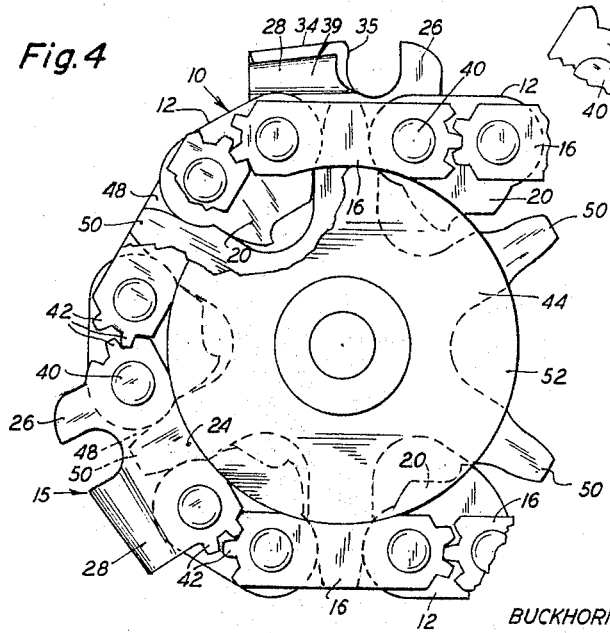
FIG. 4 is a side elevational view of the drive sprocket of the chain saw with the chain of the present invention thereon and with parts broken away to more clearly show the structure.
Figure 6:
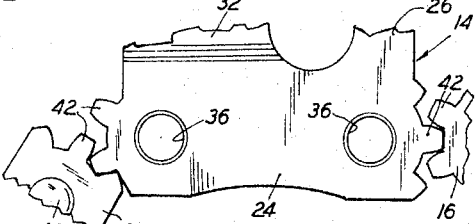
FIG. 6 is a view similar to FIG. 5 showing the interengagement of the gear teeth at the ends of the side links.

The stabilizing effect discussed above is particularly effective during the time the various links of the chain are actually on a sprocket such as the drive sprocket 44 shown in FIGS. 3 and 4. Any rotation of a pair of laterally adjacent side links such as a pair including a cutter link about one or both of its pivotal axes requires similar rotation of other pairs of side links and similar rotation of center links. This is prevented by the teeth of the sprocket which resist such rotation of center links and also resist the resulting shortening of the effective length of the portion of the chain on the sprocket. The result is that the cutter links are locked substantially rigidly in position on the sprocket. This result can be utilized to increase the efficiency of the saw chain in a boring operation in which the nose end of a saw bar with the chain running thereon is thrust endwise into a log or timber. Thus an idler sprocket 46 is advantageously employed at the nose end of the saw bar 22, shown in FIG. 3, to not only reduce friction but also to hold the cutter links accurately in position for most effective cutting in a boring operation.

With reference to FIG. 4, the operating smoothness and stability of the saw chain is further enhanced by providing for driving engagement between the drive sprocket 44 and the drive links 12 at positions substantially in alignment along the path of travel of the chain with the pivot axes or rivets of the chain links. This is accomplished by making the center links 12 shorter in length than the side links 14, 15 and 16 and with a lesser distance between the centers of their rivet holes 38 than the rivet holes 36 of the side links to provide a gap 48 between longitudinally adjacent center links. The gap 48 is of sufficient length to receive elongated teeth 50 of drive sprocket 44 of the chain saw 23, shown in FIG. 3. The sprocket teeth 50 are most clearly shown in FIG. 4 and project into the gap 48 between adjacent center links so as to engage the trailing end of the center link body 18 substantially in alignment with the pivotal axes of the rivets 40 in the direction of the path of travel of the chain. This driving action can be accurately referred to as pitch line drive, since the force is applied adjacent the pitch lines of the sprocket and chain. The leading edge surface of the sprocket teeth 50 are contoured to engage the rounded trailing ends of the center link bodies 18 through a substantial area of engagement in order to reduce the wear of both center links and sprocket teeth. As apparent from FIG. 4, the sprocket 44 had radially inwardly extending sockets receiving the drive lugs 20, such sockets being between and in circumferential alignment with the sprocket teeth. A circular outer disc 52 on each side of the drive sprocket 44 has a peripheral surface upon which the side links ride as the center links are driven by the sprocket teeth.

Since the driving forces from the sprocket teeth 50 are in substantial alignment with the pivotal axes of the center links, these forces do not tend to rotate the center links about their pivotal axes. In contrast, the sprocket teeth of a conventional drive sprocket engage the rear surfaces of the center link root or lug portions 20 inwardly of the rivets 40 so as to exert a torque on the drive link in addition to the driving force in a direction tangential to the arcuate path of the chain resulting in erratic operation of the chain, particularly if the chain becomes somewhat slack.

The extending of the drive teeth 50 of the sprocket 44 into the gap 48 between the center links 12 assists in the locking action which holds the cutter links substantially rigidly in position with respect to the sprocket while such links are traveling around the sprocket 44. The idler sprocket 46 at the nose end of the bar is also preferably similarly constructed so that its teeth enter the gap 48 between the center links. This provides further improved boring operations with the chain.

The above disclosed geared interengagement of the side links and pitch line drive is applicable to most saw chains but is especially advantageous when employed with a saw chain having top sharpening cutter links, such as those disclosed in my copending patent application Serial No. 310,757 filed Sept. 23, 1963. Such cutter links are sharpened by means of a sharpening element attached to a chain saw in such a position that outwardly facing surfaces of the cutter links engage a surface of the sharpening element as the saw chain travels about the sprocket, thereby to sharpen laterally extending cutting edges at the leading ends of such outer surfaces. With such cutter links, the pitch line drive and geared interengagement of side links assure that each side cutter link will be in exactly the same position and orientation with respect to the sharpening device as every other such cutter link. Thus all cutter links of the same chain have a uniform sharpened angle and clearance with respect to their respective depth gauges and, furthermore, are ground to a uniform height above the base of their respective links, resulting in a faster and smoother cutting chain than would otherwise be possible in a self sharpened chain.

Having illustrated and described in a preferred embodiment of the invention, it should be apparent to those skilled in the art that the invention permits of modification in arrangement and detail. I claim as my invention all such modifications as come within the scope of the appended claims.

I claim:
1. A saw chain comprising:
   center drive links and side links including cutter links pivotally connected to the forward and rearward portions of the center links about longitudinally spaced pivot axes,
   each of the side links having a forward and a rearward end with both ends provided with integral gear teeth, the gear teeth at each end of a side link forming a gear segment concentric with the adjacent pivot axis of the same side link,
   the gear segment on the forward end of each side link meshing with the gear segment on the rearward end of the forwardly adjacent side link and the meshing gear segments having substantially equal pitch radii so as to provide equal pivotal movement of longi- tudinally adjacent side links in opposite directions with respect to the center link connected between said longitudinal adjacent side links.

2. A saw chain comprising:

center drive links and laterally opposed pairs of side links including cutter links pivotally connected to the forward and rearward portions of the center links about longitudinally spaced pivot axes, each one of the laterally opposed side links having a forward and rearward end with both ends provided with integral gear teeth, the gear teeth at each end of each side link forming a gear segment concentric with the adjacent pivot axis of such side link, the gear segment at each end of each side link meshing with a gear segment at the adjacent end of forwardly and rearwardly adjacent side links and the meshing gear segments having substantially equal pitch radii so as to provide equal and opposite pivotal movement of longitudinally adjacent pairs of side links with respect to the center link connected between said longitudinal adjacent side link.

3. In a saw chain drive comprising in combination a saw chain and a drive sprocket, said saw chain comprising center drive links and side links including cutter links pivotally connected to the forward and rearward portions of the center links about longitudinally spaced pivot axes, said center links and side links being adapted to be trained about said drive sprocket, each of the side links having a forward and a rearward end with each end being provided with integral gear teeth forming a gear segment concentric with the adjacent pivot axis of the side link, the gear segment at each end of each side link meshing with a gear segment at the adjacent end of the longitudinally adjacent side link to provide controlled pivotal movement of longitudinally adjacent side links with respect to the center link connected between said side links, said center links being spaced apart longitudinally of the chain to provide gaps between longitudinally adjacent said center links, said drive sprocket including radially extending sprocket teeth projecting into the gaps between longitudinally adjacent center links on said sprocket, said sprocket teeth drivingly engaging the rear end of each center link in the region of a straight line interconnecting the rearmost pivot axis of the drivingly engaged center link with the forwardmost pivot axis of the center link rearwardly adjacent said drivingly engaged center link.

4. A saw chain comprising, a plurality of pairs of laterally opposed side links, center links between the laterally opposed side links, means pivotally interconnecting said center links and side links for relative pivotal movement of said links about longitudinally spaced-apart pivot axes, a pair of said pivot axes passing through each center link and each side link, one near the forward end and one near the rear end of each said link, at least some of said links including cutting elements, both ends of each laterally opposed side link defining a gear segment, the gear segment on each end of each side link intermeshing with a mating gear segment of a longitudinally adjacent side link, each gear segment of each side link having a pitch radius extending from the adjacent pivot axis of the same said side link, the pitch radii of the intermeshing gear segments of longitudinally adjacent side links being substantially equal so that angular movement of one side link in one direction relative to a connected center link effects substantially the same angular movement of a longitudinally adjacent side link in the opposite direction relative to the same center link.

5. A saw chain according to claim 4 wherein each center link is a drive link and the cutting elements are provided on side links.

6. In a saw chain drive arrangement including in combination a saw chain, a saw bar for guiding said saw chain, a drive sprocket for driving said chain about said said bar, and means for rotating said sprocket, said saw chain including a plurality of longitudinally aligned center drive links and interconnecting side links, each said center ling including a link body and a bar-engaging root portion depending from said link body, connecting means pivotally interconnecting each center link with a longitudinally adjacent pair of side links so as to provide relative pivotal movement of said center links and side links about longitudinally spaced-apart pivot axes, a pair of said pivot axes passing through each center link body, one adjacent the rear end and the other adjacent the forward end thereof, at least some of said interconnected links including outwardly extending cutting elements, said center links being longitudinally spaced apart so as to provide a substantial space between each longitudinally adjacent pair of center link bodies, said drive sprocket including the plurality of sprocket teeth extending radially outwardly therefrom and into the spaces between the link bodies of longitudinally adjacent center links so that said sprocket teeth drivingly engage the rear ends of said center link bodies in the region of an imaginary straight line interconnecting the rearmost pivot axis of each drivingly engaged center link and the forwardmost pivot axis of the rearwardly adjacent center link, said sprocket also having radially inwardly extending sockets positioned between and in alignment with said sprocket teeth for receiving the bar engaging root portions of said center drive links.

7. A saw chain drive arrangement according to claim 6 wherein the principal driving force of each sprocket tooth is normal to the radial axis of such sprocket tooth and along said imaginary line.

8. A saw chain drive arrangement according to claim 6 wherein the primary driving interengagement of said sprocket teeth and said center links occurs in a region at the rear end of the link body of each center link at and below an imaginary line joining the adjacent pivot axes of longitudinally adjacent center links.

9. A saw chain drive arrangement according to claim 6 wherein the rear end surface of each center link body is arcuately curved and has a center of curvature coincident with the rear pivot axis of said center link, and wherein each sprocket tooth has a complementally curving link-engaging forward surface portion.

References Cited by the Examiner

UNITED STATES PATENTS

| | | | |
|---|---|---|---|
| 1,181,175 | 5/1916 | Shapiro | 74—243 |
| 1,201,748 | 10/1916 | Luce | 74—243 |
| 3,180,001 | 4/1965 | Nash | 74—250 X |
| 3,189,064 | 6/1965 | Fredickson | 143—135 |

DONALD R. SCHRAN, *Primary Examiner.*